July 19, 1927.
E. E. McNEELY
CORN HUSKER
Filed Feb. 26, 1926
1,636,380
4 Sheets-Sheet 1
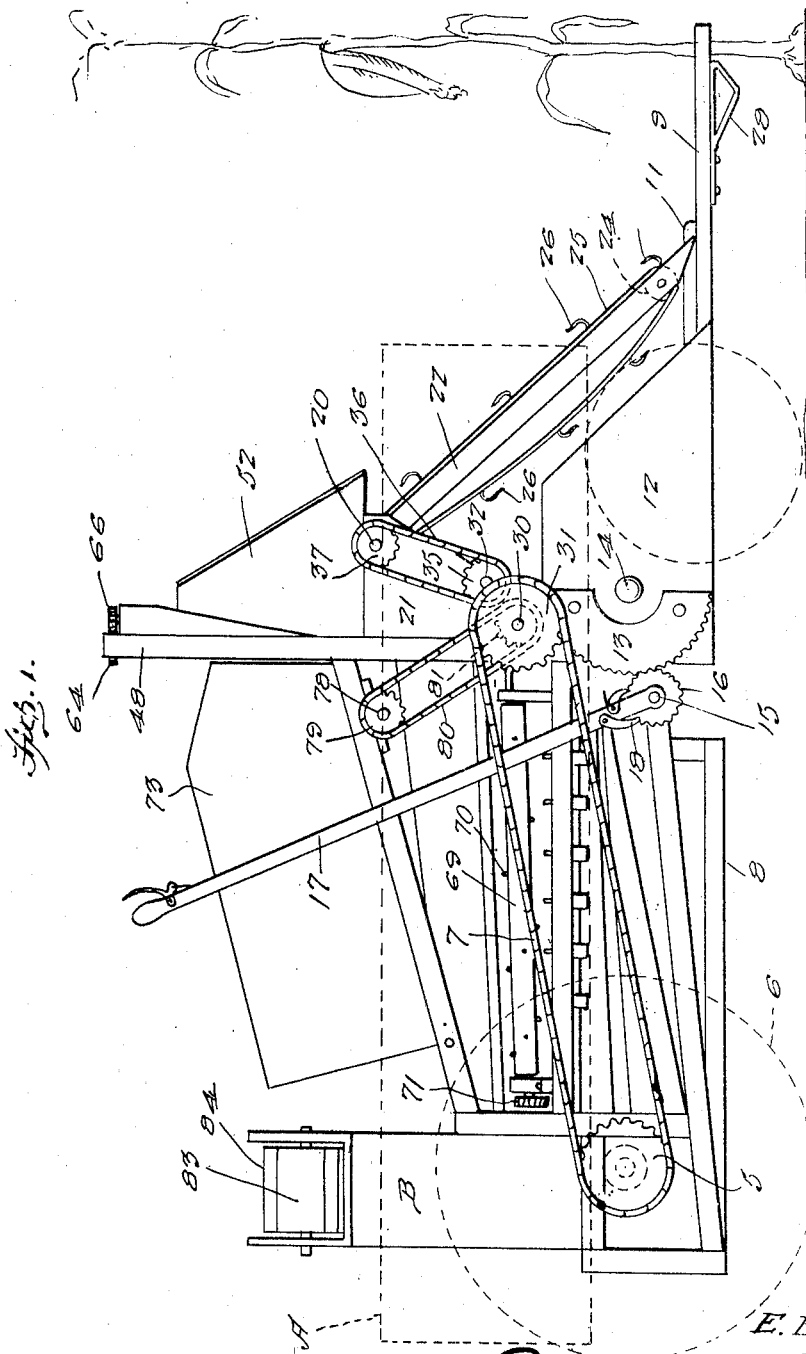
Inventor
E. E. McNeely
By Clarence A. O'Brien
Attorney

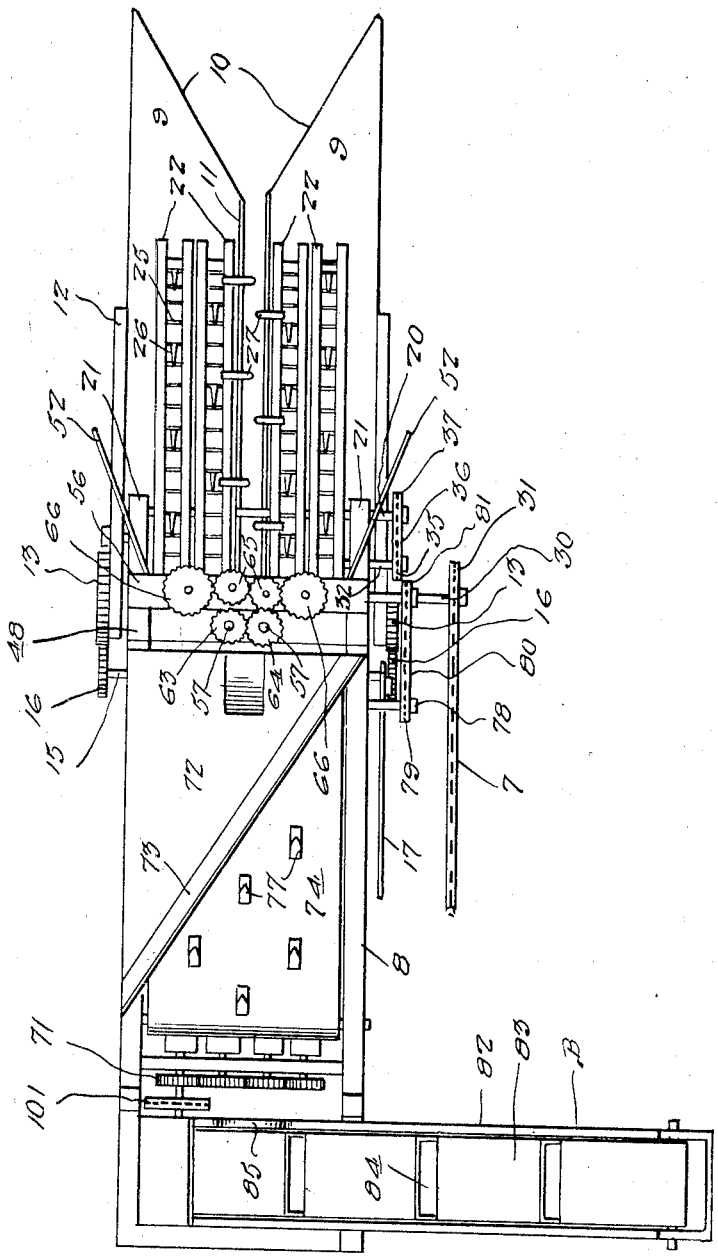

July 19, 1927.
E. E. McNEELY
CORN HUSKER
Filed Feb. 26, 1926
1,636,380
4 Sheets-Sheet 3
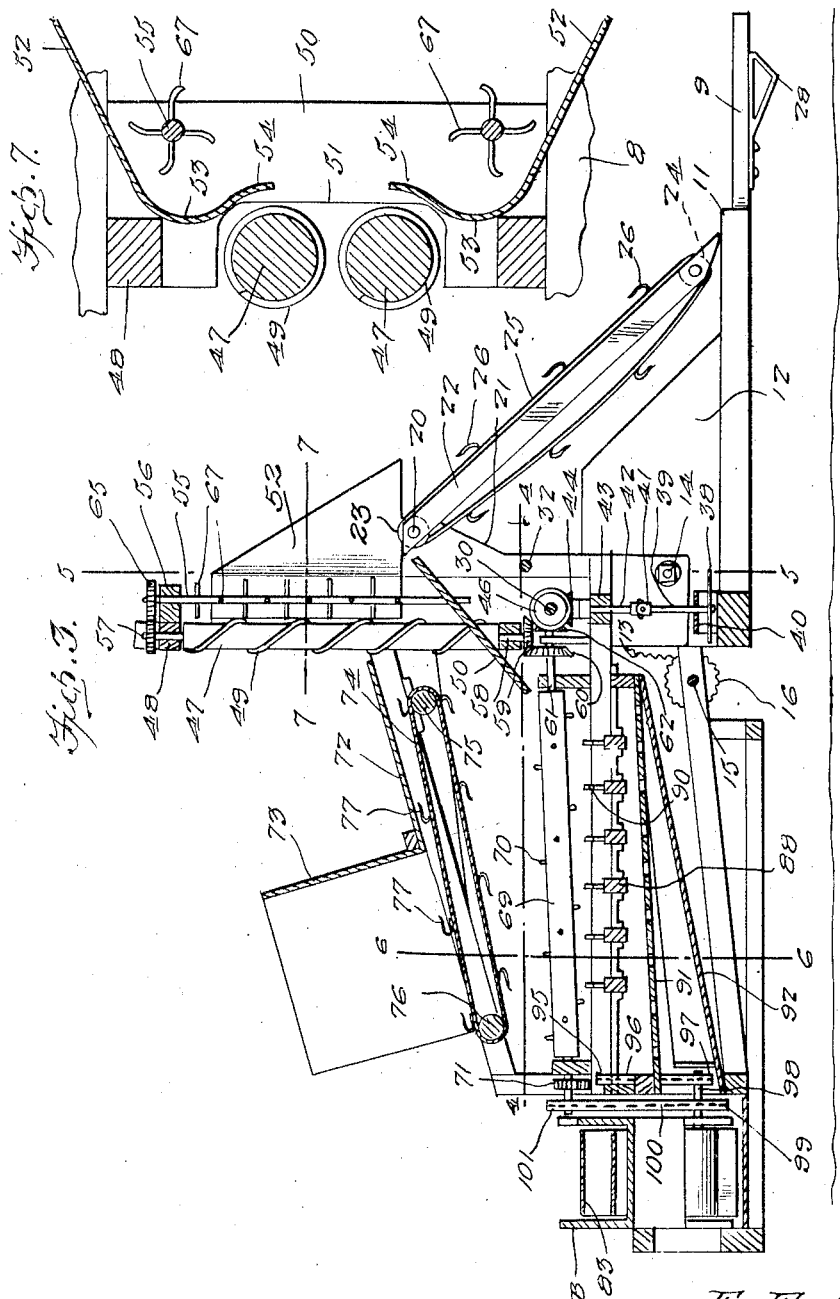
Inventor
E. E. McNeely
By Clarence A. O'Brien
Attorney July 19, 1927.
E. E. McNEELY
CORN HUSKER
Filed Feb. 26, 1926
1,636,380
4 Sheets-Sheet 4
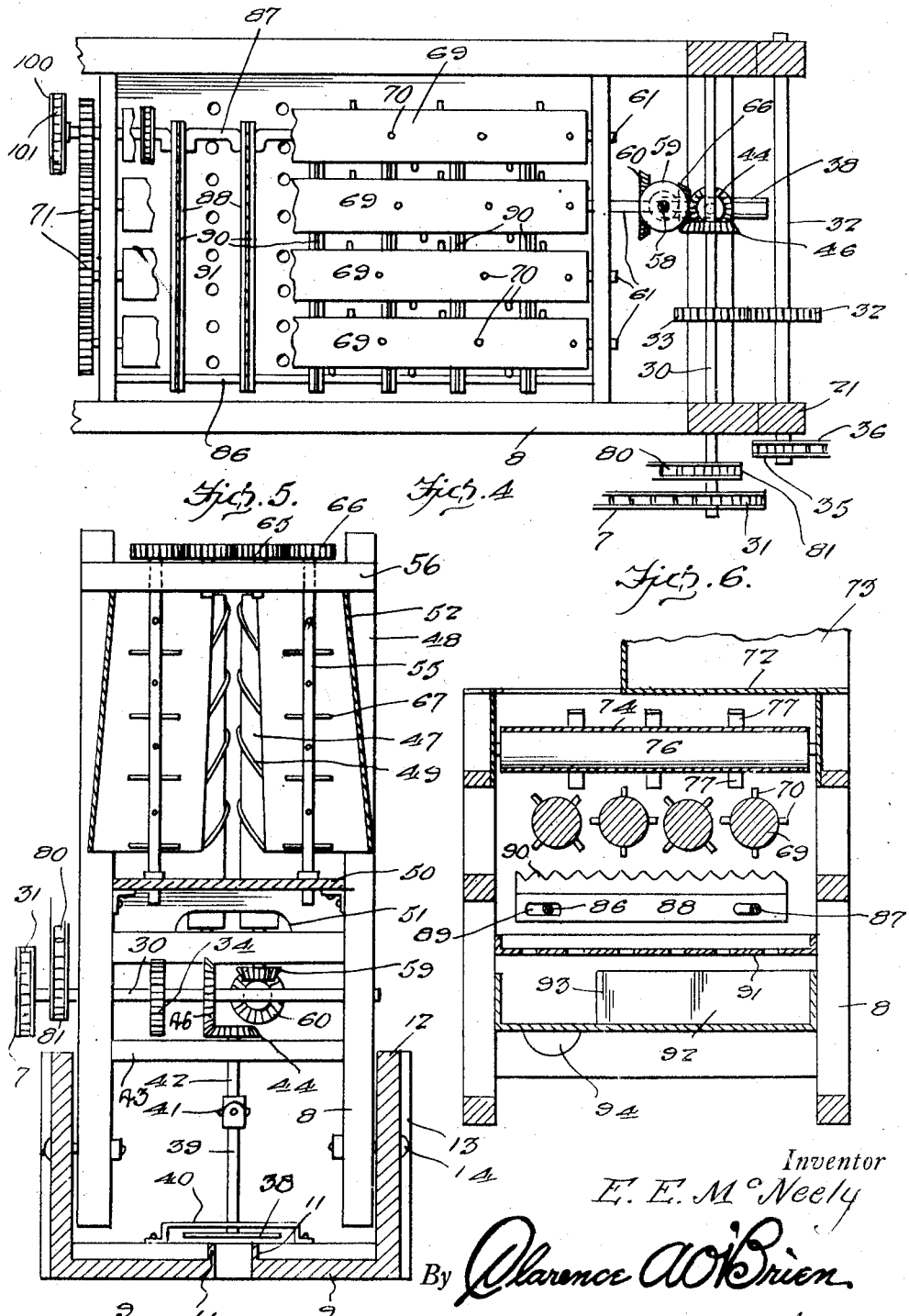
Inventor
E. E. McNeely
By Clarence A O'Brien
Attorney Patented July 19, 1927.

1,636,380

UNITED STATES PATENT OFFICE.

EARL E. McNEELY, OF WALDRON, INDIANA, ASSIGNOR OF ONE-FOURTH TO EVERET W. CROSBY, OF GREENSBURG, INDIANA.

CORN HUSKER.

Application filed February 26, 1926. Serial No. 90,826.

The present invention appertains to field implements for harvesting crops, and is designed more particularly for gathering ears of corn and removing the husks therefrom preliminary to loading the crop into a farm wagon or like receptacle. The present application is a continuation in part of my pending application Serial No. 748,229, filed November 6, 1924.

An important object of the invention is to provide a mechanism in the nature of an attachment which may be readily applied to or detached from a farm wagon by one person with comparative ease and relative dispatch, said attachment having the operating parts driven from the wagon or by a motor mounted thereon.

Another very important object of the invention is the provision of a corn harvester which will cut the stalks from the stubble and which will snap the ears from the stalk and remove the husks from the ears without injuring the grain, the ears divested of the husks being loaded into the wagon or other suitable receptacle provided for receiving the crop as the same is harvested, while the stalks and husks are thrown free from the mechanism to the ground.

Another very important object of the invention is to provide a shelled corn screen and pan in combination with the mechanism so that the shelled corn will be delivered to a conveying mechanism for deliverance into the wagon or other like receptacle.

Another very important object of the invention is the provision of a gathering mechanism for straightening up the standing stalks which mechanism is capable of adjustment toward or away from the ground.

A still further very important object of the invention is to provide a harvester mechanism of the character specified which involves a comparatively simple, light, and compact structure and which is efficient and reliable for the purpose designed and not liable to derangement and which may be readily stored when not required for immediate service and which may be easily, expeditiously, and conveniently attached to and detached from an ordinary farm wagon so as to be propelled and supported thereby and into which the crop is delivered as gathered.

With the above and numerous other objects in view as will appear as the description proceeds, the invention resides in certain novel features of construction, and in the combination and arrangement of parts as will be hereinafter more fully described and claimed.

In the drawings:—

Figure 1 is a side elevation of the corn husker embodying the features of my invention, showing that side adjacent the wagon to which the same is to be attached, Figure 2 is a top plan view thereof, Figure 3 is a vertical central longitudinal section through the corn husker, Figure 4 is an enlarged horizontal section taken substantially on the line 4—4 of Figure 3 looking downwardly, Figure 5 is a vertical transverse section taken substantially on the line 5—5 of Figure 3 looking to the left, Figure 6 is another vertical transverse section taken substantially on the line 6—6 of Figure 3, and Figure 7 is an enlarged horizontal section taken substantially on the line 7—7 of Figure 3 looking downwardly.

Referring to the drawing in detail it will be seen that in Figure 1 I have indicated by dotted lines an ordinary farm wagon to which my improved corn husker attachment may be applied in any suitable manner as may be convenient. By way of illustration I have shown a sprocket 5 on one of the rear wheels 6 of the vehicle A for the purpose of propelling the drive chain 7 of my attachment, however, any other suitable driving means may be utilized.

My attachment is built on a frame 8 of suitable formation which is supported by the vehicle A.

On the forward end of the frame there is disposed a pair of gathering and guide members 9 which extend forwardly of the frame as is shown to advantage in Figure 2 so that their inner edges are in parallel spaced relation, said inner edges at their forward ends flaring from each other as is indicated at 10. At said inner edges of the members 9 there are disposed rising flanges 11 as is more clearly illustrated in Figure 5. On the outer edges and rear ends of the members 9 there are provided rising sides 12, on the outer surfaces of which are fixed semi-circular gear segments 13. Pivot bolts 14 pierce the sides 12 and portions of the frame 8. A shaft 15 is journaled on the frame 8 and has gears 16 at its ends, see Figure 1, which mesh with the segments 13. A lever 17 is rockable about the axis of the shaft 15 and has pawls 18 thereon engageable with the adjacent gear 16 so that by rocking the lever 17 the members 9 may be swung upwardly or downwardly at their forward ends, as desired, depending upon the nature of the stalks to be gathered and their condition. A shaft 20 is journaled in the forwardly disposed extension 21 of the frame 8. A plurality of channel arms 22 have their upper ends pivoted on the shaft 20. These channel arms 22 are arranged in pairs, the lower ends being rested on the members 9, one pair being disposed to each side of the space between the members 9 as is clearly shown in Figure 2. Sprockets 23 are disposed in the upper ends of the arms 22 and are rotatable with the shaft 20. Similar sprockets 24 are journaled in the lower ends of the arms 22. Drag chains 25 are trained over sprockets 23 and 24 and have thereon in spaced relation fingers 26. The chains 25 of the inner arms 22 are provided with additional fingers 27 which project across the space between the members 9 as is clearly illustrated in Figure 2. When the members 9 are swung upwardly, the lower ends of the arms 22 slide forwardly and are also swung upwardly, while when the members 9 are swung downwardly, said ends of the arms 22 slide inwardly and swing downwardly. Ground engaging runners 28 are provided on the under surface of the forward ends of the members 9. The members 9 will be elevated in accordance with the condition of the stalks and the ground. Particular attention is directed to Figure 4 wherein it will be seen that a main drive shaft 30 is driven by a gear 31 over which the drive chain 7 is trained. This drive shaft 30 is journaled through the forward portion of the frame 8. A shaft 32 is journaled in the extensions 21. A gear 33 on the shaft 30 meshes with a gear 34 on the shaft 32. A sprocket 35 is fixed at one end of the shaft 32 and has a chain 36 trained thereover which is also trained over a sprocket 37 on the shaft 20. Thus, movement is imparted to the drag chains 25 so that their upper runs move upwardly and their lower runs move downwardly. The arms 22 and their respective drag chains 25, therefor, assist in gathering and straightening up the stalks before they are cut by a knife 38 which is mounted between the rear ends of the members 9, the shaft 39 thereof being journaled through a bracket 40 supported on said members 9. A universal joint 41 connects the shaft 39 with a shaft 42 journaled in the frame as at 43 having a beveled gear 44 at its upper end meshing with beveled gear 46 on the shaft 30 whereby rotary motion is imparted to the cutter 38. (See Figs. 3 and 5.)

Snapping rolls 47 are journaled vertically in the forward portion of the frame 8; an auxiliary rectangular frame 48 is provided for this purpose. These snapping rolls 47 are two in number and are slightly spaced as is indicated in Figure 5, being provided with spiral ribs 49. An inclined platform 50 extends through the lower portion of the auxiliary frame 48, said platform 50 being inclined downwardly and rearwardly and being provided with its rear edge partially cut away as at 51, so that the snapping rolls 47 may pass therethrough.

A pair of wings 52 are disposed one at each side of the auxiliary frame 48, extend forwardly therefrom and diverge from each other. The rear ends of these wings (see Fig. 7) are curved as at 53 and again curved as at 54. Shafts 55 are disposed vertically, having their lower ends journaled through the platform 50 and their upper ends journaled through a bar 56 at the upper end of the frame 48. These shafts 55 are disposed forwardly and to the outside of the snapping rolls 47 and between the wings 52, the curvatures 53 being substantially concentric to the axes of the shafts 55 while the curvatures 54 are substantially concentric as to the axes of the snapping rolls. The snapping rolls 47 are provided at their upper ends with pintles 57 and at their bottom ends with pintles 58 journaled respectively through the upper and lower portions of the auxiliary frame 48. A beveled gear 59 is disposed on one of the pintles 58, and meshes with a beveled gear 60 on a shaft 61 which is operable by a beveled gear 62 meshing with the beveled gear 46. A gear 63 is on the pintle 57 of the roll 47 having the pintle 58 provided with the beveled gear 59 and meshes with a gear 64 on the other pintle 57. A pair of gears 65 are suitably journaled on top of the bar 56 and one of them is in mesh with the gears 64, the gears 65 being in mesh with each other.

Gears 66 are in mesh with the gear 65 and are fixed to the shafts 55, and thus rotary motion is imparted to the snapping rolls 47 in opposite direction and to the shafts 55 in opposite directions. The shafts 55 are provided with kicker fingers 67 for guiding the stalks toward the center of the frame for proper engagement with the snapping rolls. From Figure 3 it will be seen that as the stalks are engaged by the snapping rolls 47 they will be severed from the stubble by knife 38, as the stalks which have been severed pass through the snapping rolls, the ears are snapped therefrom and fall downwardly onto the forward portion of the inclined platform 50 so as to slide rearwardly onto substantially horizontal husking rolls 69 on shafts 61, to one of which I have previously referred. In the present instance there are four of these husking rolls as is apparent from Figures 2, 4, and 6.

A spiral series of husking teeth 70 is provided on each roll 69. The rear ends of the shafts 61 have mounted thereon intermeshing gears 71 so that the adjacent shafts rotate in opposite directions. A platform 72 is disposed over the husking rolls 69 inclining downwardly and rearwardly from the rear of snapping rolls 47 and a fender 73 is mounted thereon to direct the stripped stalks to the one side of the husker attachment onto the ground. An endless belt 74 is trained over rollers 75 and 76, the former being forwardly disposed, and the latter disposed rearwardly of the machine. This endless belt 74 is disposed under the platform 72 and above the husking rolls 69 and has drag fingers 77 thereon for engaging the snapped ears for dragging them along the husking rolls 69 rearwardly. The shaft 78 of the forward roller 75 is shown in Figure 1 as having a sprocket 79 thereon over which is trained a chain 80 also trained over a sprocket 81 on the drive shaft 30.

The teeth 70 of the husking rolls 69 tear the husks from the ears and pass them below the rolls to be delivered outwardly to the side of the attachment as will be described later. The drag belt 74 progresses the ears rearwardly as they are being husked, and delivers the husked ears to an elevating mechanism, which I have designated generally by the letter B. This elevating mechanism B is located in the rear end of the frame 8 and inclines upwardly and to the right of the attachment having its upper delivery end disposed over the wagon to which the attachment is applied, or any other suitable receptacle. This elevating mechanism may be of any preferred or desired construction, and in the present instance is provided with a trough 82 having trained therein an endless belt 83 with scoops 84 arranged thereon at intervals. The forward side of the trough 82 is provided with a cut out 85 so that the ears may be thrown therethrough into the trough onto the endless belt 83.

A rod 86 extends longitudinally of the frame 8 to the right hand side thereof at a lower level than the rolls 69, a crank shaft 87 is journaled to extend longitudinally of the frame 8 to the left hand side thereof and is also disposed at a lower level than the rolls 69, and in the same horizontal plane with the rod 86. A plurality of bars 88 are provided at one end with slots 89 while their other ends have journaled therein the cranks of the crank shaft 87. Corrugated drag strips 90 are extended longitudinally of the upper edges of the bars 88.

Referring particularly to Figure 6 it will be noted that the crank shaft 87 is adapted to rotate in a counter-clockwise direction considering this figure so that the bars 88 are reciprocated back and forth transversely of the frame and when moving to the right of the machine, are disposed upwardly, but when moving to the left of the machine are disposed downwardly, thereby urging the husks delivered downwardly through the rolls 69 to the left of this figure, that is to the right hand side of the attachment.

A shelled corn screen 91 is disposed in the frame 8 at a lower level than the bars 88 and is inclined downwardly and rearwardly. A shelled corn pan 92 is mounted in the frame below the screen 91 and has a bottom which is inclined downwardly and rearwardly. The rear wall of the pan 92 has an opening 93, see Figure 6, and a spout 94 leading into the bottom of the conveyor or elevating mechanism B. Thus the shelled corn which falls through the husking roll 69 will land on the screen 91, and be there separated from the silk and passed through the openings of the screen into the pan 92 from which it will roll into the bottom of the elevating mechanism to be also delivered up into the wagon or like receptacle. The crank shaft 87 has a cog wheel or sprocket 95 thereon over which is trained a chain 96. This chain 96 is trained over a sprocket 97 on the shaft 98 that operates the endless belt 83 of the elevating mechanism B. A second sprocket 99 is disposed on the shaft 98 and has a chain 100 trained thereover which is also trained over a sprocket 101 on one of the husking rolls 69, thus the rotation of the husking roll 69 imparts motion to the elevating mechanism and to the husk drag mechanism.

After the attachment has been mounted to the side of a wagon, or like vehicle, the example disclosed herein being attachable to the left hand side of the vehicle, the operator manipulates the lever 17 to place the forward ends of the guide and gathering members 9 at the desired height from the ground. Thus, if the stalks are leaning considerably, or have been trampled down, the forward ends of the members should be very close to the ground, but if the stalks are standing, and the lowest ears are spaced from the ground, the forward ends of the members may be raised accordingly.

As the wagon moves forwardly, the edges 10 of the members 9 gather and guide the stalks toward the space between the flanges 11. The drag chains and fingers on the channel arms 22 straighten up the stalks so that they will be properly delivered for engagement with the fingers on the shafts 55 to be directed toward the snapping rolls 47. As the stalks are severed by the knife 38 and pass through the rolls 47, the ears are snapped therefrom and drop down on the platform 50 and are led to the husking rolls 69. In the meantime, the stripped stalks are passed onto the platform 72 and guided off to the left hand side of the attachment by the fender 72. The ears delivered onto the husking rolls 69 are moved rearwardly by the drag belt 74 and are husked, the husked ears being delivered into the elevating mechanism B and up over into the wagon while the husks are delivered down between the rolls 69. These husks are dragged to the left hand side of the machine by the husk drag bars 88. As the ears are being husked, some kernels are bound to be knocked therefrom and dropped down onto the shelled corn screen 91 and be separated from the silk and passed through the openings in the screen into the pan 92 and thence into the elevating mechanism B. The construction, operation, and advantages of this invention should now be clearly understood by those skilled in this art without a more detailed description thereof. The present embodiment of the invention has been disclosed in detail, since in actual practice it has attained the features of advantage enumerated as desirable in the statement of the invention, and the above description, particular emphasis being placed upon the compactness and convenience of the attachment, which in the embodiment which I have actually built, can be lifted by a single individual and operates in a most reliable manner. It is apparent, however, that numerous changes in the details of construction, and in the combination and arrangement of parts may be resorted to without departing from the spirit or scope of the invention as hereinafter claimed or sacrificing any of its advantages.

Having thus described the invention, what I claim as new and desire to secure by Letters Patent is:—

1. A harvester of the class described including, in combination, a frame, a pair of parallel spaced forwardly extending guide and gathering members pivoted to the frame, means for swinging said members, a plurality of bars having their upper ends pivotally mounted on the frame and their lower ends slidably resting on the members, and endless drag means operable in orbits about said bars.

2. A harvester including, in combination, a frame, a pair of guide and gathering members pivoted forwardly of the frame and extending in parallel spaced relation, means for swinging the members, a plurality of channel bars having their upper ends pivotally mounted on the frame, and their lower ends slidably resting on the members, sprockets journaled in the ends of the bars, drag chains trained over said sprockets and movable in the channels of the bars and drag fingers on said chains.

3. A corn harvester of the class described including, in combination, a frame, cutting, snapping, and husking mechanisms mounted on the frame, a pair of guiding and gathering members pivoted at the lower front portion of the frame to extend in parallel spaced relation, the cutting mechanism being located adjacent the rear ends of said members, a plurality of arms pivotally mounted at their upper ends on the forward upper portion of the frame and having their lower ends slidably resting on the members, drag mechanisms on said bars.

4. A corn harvester of the class described including, in combination, a frame, cutting, snapping, and husking mechanisms mounted on the frame, a pair of guiding and gathering members pivoted at the lower front portion of the frame to extend in parallel spaced relation, the cutting mechanisms being located adjacent the rear ends of said members, a plurality of arms pivotally mounted at their upper ends on the forward upper portion of the frame and having their lower ends slidably resting on the members, drag mechanisms on said bars, said snapping mechanism being located to the rear of the upper ends of the bars and extending vertically, said husking mechanism extending horizontally and rearwardly from the snapping mechanism, and a platform extending from the upper ends of the bars to the forward end of the husking mechanism.

5. A corn harvester of the class described including, in combination, a frame, cutting, snapping, and husking mechanisms mounted on the frame, a pair of guiding and gathering members pivoted at the front lower portion of the frame to extend in parallel spaced relation, the cutting mechanisms being located adjacent the rear ends of said members, a plurality of arms pivotally mounted at their upper ends on the forward upper portion of the frame and having their lower ends slidably resting on the members, drag mechanisms on said bars, said snapping mechanism being located to the rear of the upper ends of the bars and extending vertically, said husking mechanism extending horizontally and rearwardly from the snapping mechanism, a platform extending from the upper ends of the bars to the forward end of the husking mechanism, elevating means at the rear of the frame delivering the husked ears into a wagon on which the frame is supported.

6. A corn harvester of the class described including, in combination, a frame, cutting, snapping, and husking mechanisms mounted on the frame, a pair of guiding and gathering members pivoted at the front lower portion of the frame to extend in parallel spaced relation, the cutting mechanisms being located adjacent the rear ends of said members, a plurality of arms pivotally mounted at their upper ends on the forward upper portion of the frame and having their lower ends slidably resting on the members, drag mechanisms on said bars, said snapping mechanism being located to the rear of the upper ends of the bars and extending vertically, said husking mechanism extending horizontally and rearwardly from the snapping mechanism, a platform extending from the upper ends of the bars to the forward end of the husking mechanism, elevating means at the rear of the frame delivering the husked ears into a wagon on which the frame is supported, husk drag means mounted on the frame below the husking mechanism to deliver the husks to the side of the frame.

7. A corn harvester of the class described including, in combination, a frame, cutting, snapping, and husking mechanisms mounted on the frame, a pair of guiding and gathering members pivoted at the front lower portion of the frame, to extend in parallel spaced relation, the cutting mechanisms being located adjacent the rear ends of said members, a plurality of arms pivotally mounted at their upper ends on the forward upper portion of the frame and having their lower ends slidably resting on the members, drag mechanisms on said bars, said snapping mechanism being located to the rear of the upper ends of the bars and extending vertically, said husking mechanism extending horizontally and rearwardly from the snapping mechanism, a platform extending from the lower ends of the bars to the forward end of the husking mechanism, elevating means at the rear of the frame delivering the husked ears into a wagon on which the frame is supported, husk drag means mounted on the frame below the husking mechanism to deliver the husks to the side of the frame, and ear drag means above the husking mechanism for moving the ears longitudinally of the frame along the husking mechanism.

8. A corn harvester of the class described including, in combination, a frame, cutting, snapping, and husking mechanisms mounted on the frame, a pair of guiding and gathering members pivoted at the front lower portion of the frame to extend in parallel spaced relation, the cutting mechanisms being located adjacent the rear ends of said members, a plurality of arms pivotally mounted at their upper ends on the forward upper portion of the frame and having their lower ends slidably resting on the members, drag mechanisms on said bars, said snapping mechanism being located to the rear of the upper ends of the bars and extending vertically, said husking mechanism extending horizontally and rearwardly from the snapping mechanism, a platform extending from the upper ends of the bars to the forward end of the husking mechanism, elevating means at the rear of the frame delivering the husked ears into a wagon on which the frame is supported, husk drag means mounted on the frame below the husking mechanism to deliver the husks to the side of the frame, ear drag means above the husking mechanism for moving the ears longitudinally of the frame along the husking mechanism, an inclined platform above the ear drag means to the rear of the snapping mechanism and a fender on said platform to deflect the stripped stalks to one side of the frame.

9. In a corn harvester, a frame, a pair of vertically disposed snapping rolls located forwardly of the frame, a harvesting mechanism located forwardly of the frame to deliver stalks to the snapping rolls, a severing mechanism on the frame below the snapping rolls for severing the stalks delivered thereto, a platform on the frame inclined downwardly and rearwardly at the lower ends of the snapping rolls, a second platform inclined downwardly and rearwardly at the rear of the intermediate portions of the snapping rolls, a fender on said second platform to lead stripped stalks to one side of the frame, a plurality of horizontally disposed husking rolls journaled in the frame below and immediately to the rear of the first platform, a drag mechanism under the second platform and over the husking rolls for moving snapped ears along said husking rolls, an elevating mechanism at the rear of the frame for receiving the husked ears from the husking rolls, said elevating mechanism being inclined upwardly and to one side of the frame.

10. In a corn harvester, a frame, a pair of vertically disposed snapping rolls located forwardly of the frame, a harvesting mechanism located forwardly of the frame to deliver stalks to the snapping rolls, a severing mechanism on the frame below the snapping rolls for severing the stalks delivered thereto, a platform on the frame inclined downwardly and rearwardly at the lower ends of the snapping rolls, a second platform inclined downwardly and rearwardly at the rear of the intermediate portions of the snapping rolls, a fender on the second platform to lead stripped stalks to one side of the frame, a plurality of horizontally disposed husking rolls journaled in the frame below and immediately to the rear of the first platform, a drag mechanism under the second platform and over the husking rolls for moving snapped ears along said husking rolls, an elevating mechanism at the rear of the frame for receiving the husked ears from the husking rolls, said elevating mechanism being inclined upwardly and to one side of the frame, a transversely operating drag mechanism disposed in the frame under the husking rolls.

11. In a corn harvester, a frame, a pair of vertically disposed snapping rolls located forwardly of the frame, a harvesting mechanism located forwardly of the frame to deliver stalks to the snapping rolls, a severing mechanism on the frame below the snapping rolls for severing the stalks delivered thereto, a platform on the frame inclined downwardly and rearwardly at the lower ends of the snapping rolls, a second platform inclined downwardly and rearwardly at the rear of the intermediate portions of the snapping rolls, a fender on the second platform to lead stripped stalks to one side of the frame, a plurality of horizontally disposed husking rolls journaled in the frame below and immediately to the rear of the first platform, a drag mechanism under the second platform and over the husking rolls for moving snapped ears along said husking rolls, an elevating mechanism at the rear of the frame for receiving the husked ears from the husking rolls, said elevating mechanism being inclined upwardly and to one side of the frame, a transversely operating drag mechanism disposed in the frame under the husking rolls, a shelled corn screen in the frame below the drag mechanism last mentioned and a shelled corn pan under the screen having an inclined bottom leading rearwardly into the bottom of the elevating mechanism.

In testimony whereof I affix my signature.

EARL E. McNEELY.